United States Patent [19]
Evseev

[11] 3,805,363
[45] Apr. 23, 1974

[54] METHOD OF MANUFACTURING OF PRESSURE HOSES AND DEVICE FOR EFFECTING THIS METHOD

[76] Inventor: Vladimir Alexandrovich Evseev, ulitsa Shirinskaya, 17, kv. 59, Krasnoyarsk, U.S.S.R.

[22] Filed: May 17, 1972

[21] Appl. No.: 254,240

[52] U.S. Cl................ 29/423, 29/208 D, 29/208 R
[51] Int. Cl............................................. B23p 17/00
[58] Field of Search.............. 29/423, 208 D, 208 R; 156/181, 182, 184, 194

[56] References Cited
UNITED STATES PATENTS

| | | | |
|---|---|---|---|
| 1,661,835 | 3/1928 | Keller | 29/423 |
| 2,006,333 | 7/1935 | Angell et al. | 57/160 X |
| 3,258,955 | 7/1966 | Lindsay | 29/423 X |
| 3,263,321 | 8/1966 | Lombardi | 29/429 |

*Primary Examiner*—Charles W. Lanham
*Assistant Examiner*—Victor A. DiPalma
*Attorney, Agent, or Firm*—Eric H. Waters

[57] ABSTRACT

A tubular chamber is filled with a fluid medium and is placed on the material of a strengthening carcass, the material and the chamber then being moved in the direction of the longitudinal axis of the chamber. During this motion they are simultaneously and repeatedly turned through the same angle and in the same direction within a limited length of their travel so that at the end of this length the material is found to be rolled on the chamber. A device for rolling-up the chamber into the material of the strengthening layer comprises coaxially mounted holders in which each holder is made in the form of a spring washer having radial slots accommodating bearings. When the material and the chamber pass through the holders, the bearings rotate and turn the material and chamber through the same angle so that at the outlet of the mechanism the material is rolled about the periphery of the chamber, thereby encasing the latter and forming a pressure hose.

5 Claims, 5 Drawing Figures

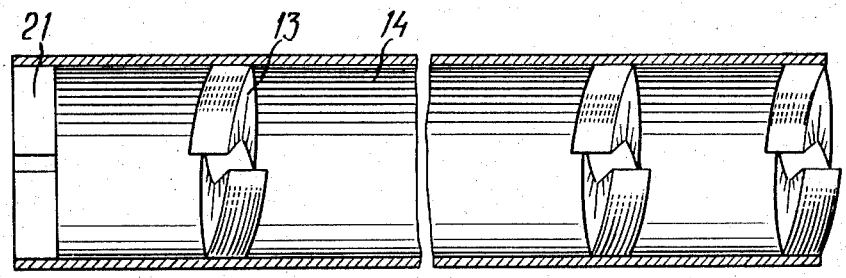
FIG. 3
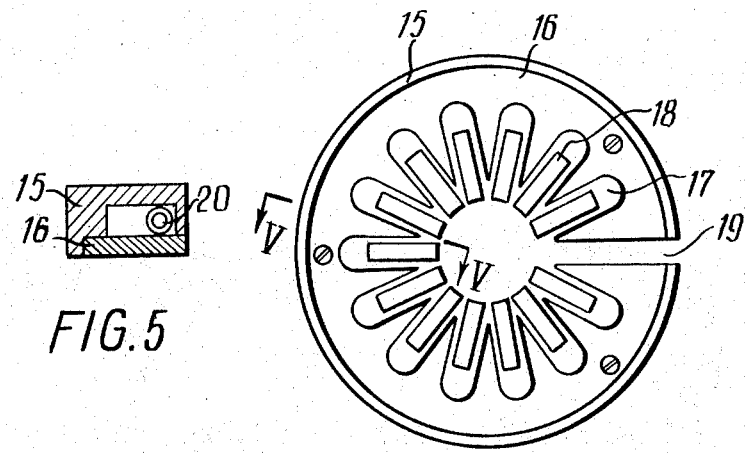
FIG. 5
FIG. 4

METHOD OF MANUFACTURING OF PRESSURE HOSES AND DEVICE FOR EFFECTING THIS METHOD

The present invention relates to improvements in the methods of manufacturing of pressure hoses and devices for effecting the same. The invention can be used in manufacture of pressure hoses laid on supports and intended for transporting fluid media. Such a pressure hose constitutes a tubular chamber of an elastic material, usually rubber, wound by one or a few layers of fabric material serving as a strengthening carcass. The external surface of the strengthening carcass is usually coated with a layer of vulcanized material protecting the hose from the atmospheric effects.

Known in the art is a method of making pressure hoses to be laid on supports consisting in that first a tubular chamber of a limited length is made of rubber. The inner space and the external surface of the tubular chamber are treated with a substance preventing it from agglutination. The tubular chamber is allowed to cool and is put on a mandrel (tube core), then the external surface of the chamber is greased with a rubber solution. After the rubber solution has dried, the tubular chamber with the mandrel is rolled into a rubberized fabric along its entire length, and an external rubber layer is laid on the surface of the rolled fabric.

The disadvantages of this method consist in a limited length of the pressure hose produced, a low efficiency, a large number of separate operations being used in the process, application of cores, necessity in a large production area, and impossibility of performing a continuous process of manufacturing of such a hose.

Attempts have been made to eliminate mandrels (or cores) in the process of making communication pressure hoses. Thus, one of the methods consists in that a section of the tubular chamber is filled with air, its ends are hermetically sealed, and the section is laid onto a band of rubberized fabric located between two plane-parallel plates. On moving the plates in the direction transverse to the longitudinal axis of the tubular chamber, this chamber is rolled into the fabric.

However, this method has a low efficiency, limits the length of the pressure hose to be made and does not allow the process to be effected continuously.

An object of the present invention is to develop a method of manufacturing of pressure hoses that would allow the process of making to be effected continuously.

This and other objects are attained due to the fact that in the process of manufacturing of pressure hoses, in which the tubular chamber made of an elastic material is filled with a fluid medium, placed on the material of the strengthening layer of the carcass, into which the chamber is then rolled, according to the invention, during the rolling the material of the strengthening layer together with the chamber are moved simultaneously in the direction of the longitudinal axis of the chamber, and within a limited distance of their travel the chamber and material are repeatedly turned through the same angle and in the same direction relative to the longitudinal axis of the chamber so that at the end of this limited distance of rolling each point of the chamber together with the material performs at least one complete revolution about the longitudinal axis of the chamber; as a result, the material of the strengthening layer is found to be rolled on the chamber.

The advantage of the proposed method is that it provides for a continuous process of manufacturing of pressure hoses.

The device for effecting the proposed method comprises a means for shaping a tubular chamber, a means for feeding a fluid medium into the space of the tubular chamber, and a means for rolling the material of the strengthening layer on the chamber; according to the invention, the material rolling means is formed by two coaxially arranged holders, each being made in the form of a spring washer having internal radial slots in which there are mounted bearings rotating during their interaction with the material of the strengthening layer moving within the holders of the chamber, said bearings during their rotation provide for a common turn of the material of the strengthening layer and the chamber about its longitudinal axis so that the material is rolled on the chamber.

The proposed device allows the process of manufacturing of pressure hoses to be almost completely mechanized thereby eliminating the use of hard manual labour.

In order to provide continuous movement of the material of the strengthening carcass and the chamber through the holders, pulling rollers must be mounted at the outlet of the rolling-up mechanism.

Other objects and advantages of the invention will be apparent from the following detailed description of one particular embodiment of the invention, reference being made to the accompanying drawings, in which:

FIG. 1 $a,b,c,d,e,f,g,h,k,l,m,n,o$ illustrates the method of rolling the material of the strengthening layer of the carcass on a tubular chamber;

FIG. 3 shows the mechanism for rolling the material of the strengthening layer on a tubular chamber;

FIG. 4 shows a front view of the holder;

FIG. 5 is a sectional view taken along the line V—V in FIG. 4.

For a better understanding of the proposed method of manufacturing of pressure hoses, let us consider in detail the process of rolling a tubular chamber into the material of the strengthening layer of the carcass by means of multiple turning of the material of the strengthening layer of the carcass together with the tubular chamber through the same angle and in the same direction with respect to the longitudinal axis of the tubular chamber without transferring them in the direction of the longitudinal axis.

Figure 1:
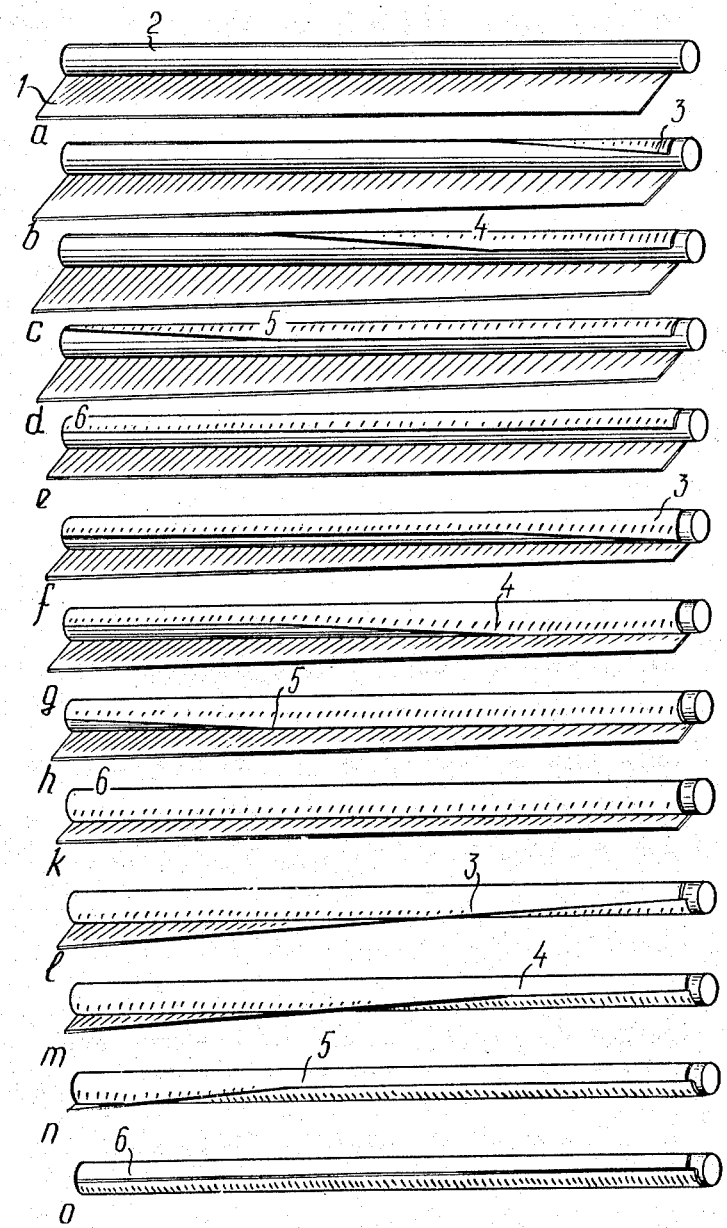

A tubular chamber 2 (FIG. 1a) is put on one of the longitudinal edges of a fabric 1 rubberized at both sides and serving as a material of the strengthening layer of a carcass. Then the rubberized fabric 1 with the tubular chamber 2 are alternately turned at points 3,4,5 and 6 (FIG. 1 $b,c,d,e$) through the same angle and in the same direction with respect to the longitudinal axis of the tubular chamber 2. Thus, a portion of the tubular chamber 2 (FIG. 1) is rolled into the rubberized fabric 1 and turned about its longitudinal axis by a certain angle. After that, the next turn of the rubberized fabric 1 and tubular chamber 2 is effected at points 3,4,5 and 6 (FIG. 1 $f,g,h,k$). The tubular chamber 2 (FIG. 1k) is now completely rolled into the rubberized fabric 1. The process of turning the rubberized fabric 1 with the tubular chamber 2 is repeated at the points 3,4,5 and 6 (FIG. 1 $l,m,n,o$). Thus, the band of the rubberized fabric 1 (FIG. 1o) is completely rolled on the tubular chamber 2.

If the multiple turning of the tubular chamber 2 with the material of the strengthening layer of the carcass 1 is effected simultaneously with their movement along the axis of the tubular chamber 2, this procedure is identical to that described above, the only difference being that the multiple turning is carried out not alternately at each point, but at all the points of the limited portion simultaneously and continuously through the same angle with the movement along the longitudinal axis of the chamber. But since the points of the tubular chamber with the material of the strengthening layer of the carcass are moved from the beginning of the limited portion to its end with a difference in time, some points of the chamber are coiled earlier than the others. In the process of movement, as soon as the points of the chamber stop rotating within a limited portion, all the points of the chamber tend to occupy the same position so that the chamber straightens.

Thus, in order to effect the rolling of the chamber into the material of the strengthening layer of the carcass, it is necessary to repeatedly turn the chamber and material during their motion through the same angle and in the same direction with respect to the longitudinal axis of the tubular chamber. At one end of this limited portion of rolling each point of the tubular chamber together with the material of the carcass strengthening layer must perform at least one complete revolution about the longitudinal axis of the tubular chamber so that the material of the strengthening layer of the carcass is rolled on the tubular chamber.

Figure 2:
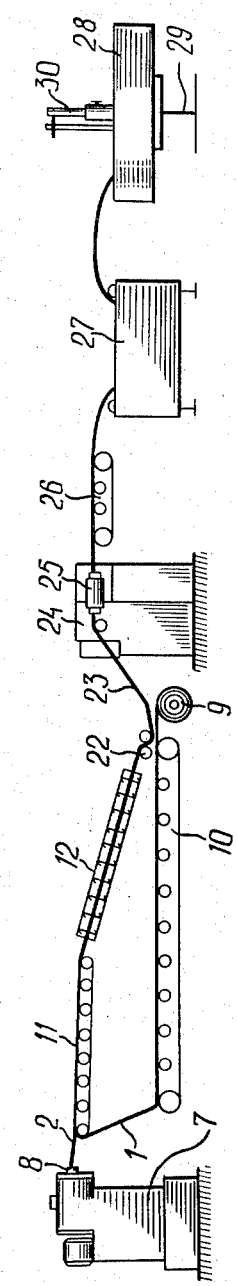
FIG. 2 shows a schematic diagram of the device for effecting the proposed method.

The device for effecting the proposed method comprises a worm press 7 (FIG. 2) with a head 8 in which there is located a shaper of a tubular chamber 2. The head is provided with a mechanism (not shown) for feeding a fluid medium, for example water, into the space of the tubular chamber 2. A conveyer 10 is provided for rolling a rubberized fabric 1 from a roll 9. A roller table or conveyer 11 is mounted near the head 8 at the outlet side of the tubular chamber 2. This conveyer is used for transporting the tubular chamber 2 and the rubberized fabric 1. The heated tubular chamber 2 is glued to the rubberized fabric 1 on the roller table 11 so as to provide their further simultaneous motion. A mechanism 12 serves for rolling up the rubberized fabric 1 serving as a material for the strengthening layer of the carcass on the tubular chamber 2. The mechanism 12 should be disposed at an angle to the horizontal to provide for an additional pressure of the fluid medium within the space of the tubular chamber 2 on the section of rolling the chamber in the material of the strengthening carcass. This will make it possible to maintain a constant pressure inside the chamber which otherwise would be reduced due to an accelerated flow of the fluid during the rolling of the chamber.

The mechanism 12 is formed by holders 13 mounted coaxially on a base 14 (FIG. 3). Each holder is made in the form of a spring washer. The holder base 14 (FIG. 4) consists of a casing 15 with a cover 16 provided with inner radial slots 17 for accommodating rolling bearings 18. The radial aperture 19 is used for passing the edge of the fabric. The casing 15 (FIG. 5) of the holder 13 is provided with a circular slot for housing a cylindrical spring 20 serving as an axle for the rolling bearings and two openings (not shown) for fixing the ends of the cylindrical spring 20.

To prevent rotation of the tubular chamber on the roller conveyer, the holder 21 (FIG. 3) mounted at the inlet of the rolling-up mechanism is made in the form of a cylindrical washer. The base 14 is inclined to the horizontal so that the first (as viewed in the direction of movement of the chamber) holder is disposed above the next holders.

Mounted at the outlet of the rolling up mechanism 12 (FIG. 2) are pulling rollers 22 whose drive (not shown) operates in synchronism with the drive of the conveyor 9 and is used for simultaneous motion of the rubberized fabric 1 with the tubular chamber 2 along the roller conveyer 11 and for pulling the chamber with the fabric through the rolling up mechanism 12.

The device is provided with a worm screw 24 with a skewed head 25 for applying an external rubber layer onto the pressure hose 23 and a conveyor 26 for transporting the hose 23 through the head 25. The bath 27 is filled with liquid for cooling the hose and lubricating the exterior thereof so as to prevent the coils of the hose from sticking together when the hose is wound within a tank 28.

The tank 28 is mounted on a rotary support 29 having an upright 30 with controllable height for fixing the open end of the hose at a definite level with respect to the horizontal so as to maintain a constant pressure of the fluid medium within the chamber 2 of the hose.

The manufacture of pressure hose according to the proposed method is effected as follows.

At first, the rubberized fabric is fed from the roll 9 (FIG. 2) along the conveyer 10 and the roller conveyer 11, while a cord with a device for securing the fabric 1 is pulled through the rolling up mechanism 12. One end of the cord is fixed to the fabric 1, while the other end thereof is put into the pulling rollers 22. The worm press is operated, and the tubular chamber 2 fed from the head 8 is laid onto the rubberized fabric lying on the roller conveyer 11. The end of the tubular chamber is hermetically sealed and water is fed into its space. After that the drive of the pulling roller 22 and conveyer 9 is switched on.

The rubberized fabric 1 starts moving along the roller conveyer 11 together with the tubular chamber 2, and they come together into the rolling up mechanism 12.

While moving in the rolling up mechanism 12, the fabric 1 with the chamber 2 rotate the bearings 18 of the coaxially mounted holders 13. The bearings of each holder of the rolling-up mechanism 12, when rotating at an angle to the longitudinal axis of the chamber 2, make the chamber 2 to rotate about its longitudinal axis. But, since the bearings of each holder of the rolling-up mechanism 12 rotate the chamber 2 with the fabric individually, the rotation of the chamber 2 with the fabric 1 is limited by a turn in each holder of the rolling up mechanism through an equal angle relative to the longitudinal axis of the chamber 2. As a result, the material of the strengthening layer of the carcass 1 is rolled on the chamber 2.

The tubular chamber 2 rolled up into the rubberized fabric 1 is fed into the pulling rollers 22, 23. After that, the cord is disconnected and the end of the hose is passed through the skewed head 25 in which the external rubber layer is applied onto the hose. After passing the skewed head 25, the hose 23 is directed to the conveyor 26 and then into the bath 27. From the bath 27 the hose is directed into the tank 28 for winding coiling. In so doing, the end of the hose is desealed and secured on the upright 30.

The proposed method of making pressure hoses provides for high efficiency of the process due to its continuity and can be carried out by means of the simplest mechanical devices.

We claim:

1. A method of manufacturing of pressure hoses comprising a tubular chamber of an elastic material encased in a strengthening layer of a carcass, comprising; filling the tubular chamber with a fluid medium; positioning the tubular chamber on the material of a strengthening layer of a carcass; simultaneously moving said chamber together with said material in the direction of the longitudinal axis of the chamber while during their movement within a limited distance turning them simultaneously and repeatedly through the same angle and in the same direction so that at the end of this limited distance each point of the chamber performs at least one complete revolution together with the material about the longitudinal axis of the chamber whereby the material of the strengthening layer is rolled about the circumference of the chamber.

2. A method as claimed in claim 1, in which the chamber and the material are continuously fed for rolling.

3. A device for the manufacture of pressure hoses formed of a tubular chamber of an elastic material encased in a strengthening layer of a carcass; comprising means for shaping a tubular chamber and sealing the leading end thereof, means for feeding a fluid medium into the space of the tubular chamber, a mechanism for rolling the material of the strengthening layer on the chamber formed by coaxially mounted holders, each holder being made in the form of a spring washer having radial internal slots accommodating rotary bearings; and means for rotating said bearings during their interaction with the chamber and the strengthening layer material for moving the latter through the holders, so as to rotate said material and said chamber in unison about the longitudinal axis of the chamber and cause the material to be rolled about the circumference of the chamber.

4. A device as claimed in claim 3, in which at the outlet of the rolling-up mechanism there are mounted pulling rollers used for transporting the material and the chamber through the holders.

5. A device as claimed in claim 3, in which the rolling-up mechanism is mounted at an angle to the horizontal so that the first holder (as viewed along the direction of motion of the chamber) is located above the next holders.

* * * * *